Aug. 18, 1964  W. L. RAUSCH  3,145,051
AIRPLANE PASSENGER SEAT
Filed Dec. 19, 1961  2 Sheets-Sheet 1
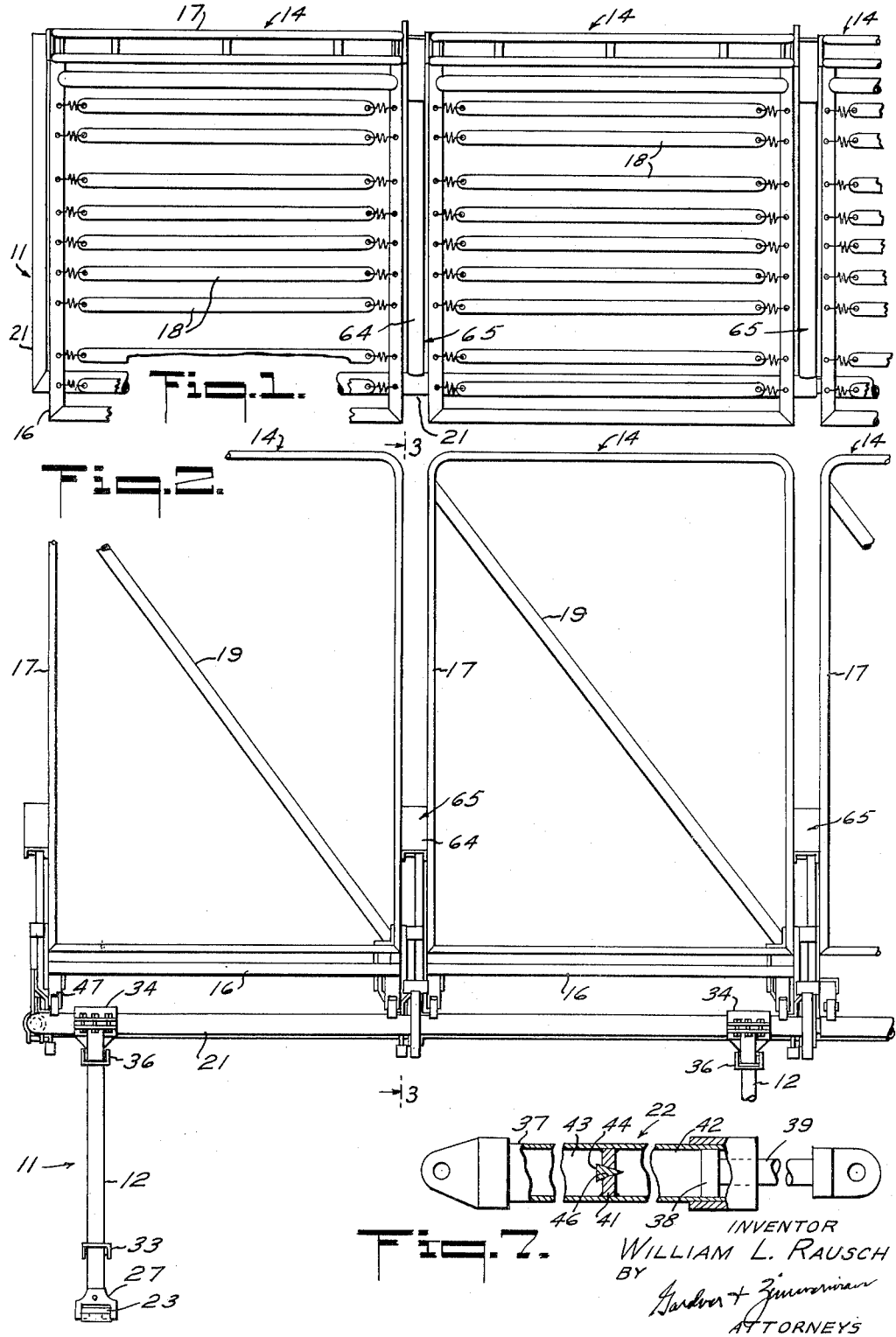
INVENTOR
WILLIAM L. RAUSCH
BY
Gardner + Zimmerman
ATTORNEYS

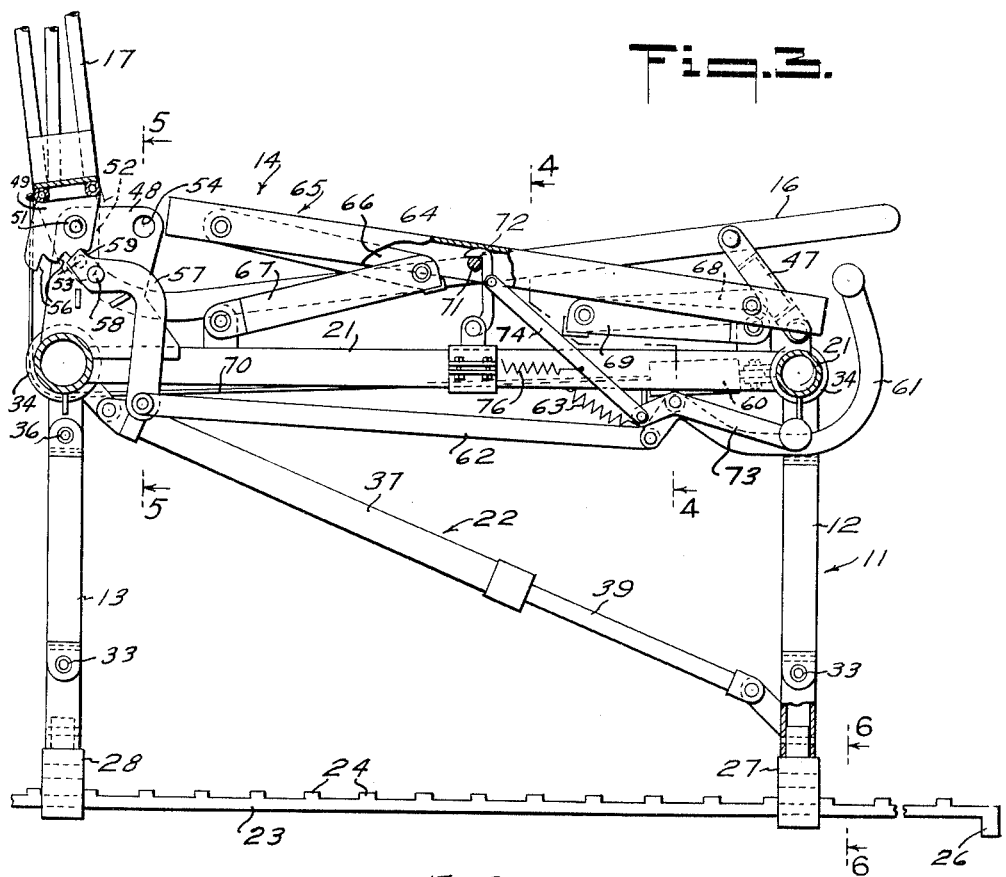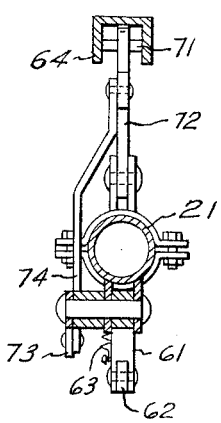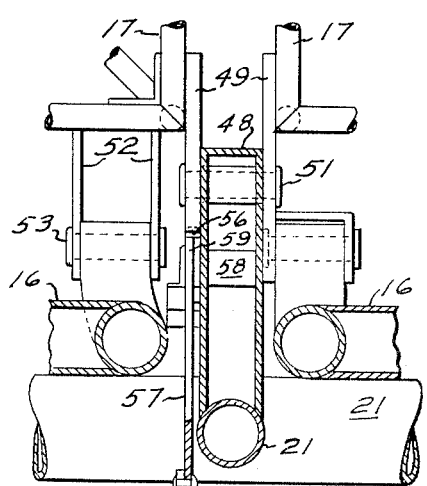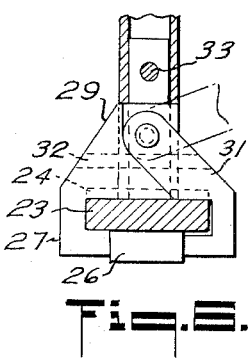

United States Patent Office 3,145,051
Patented Aug. 18, 1964

3,145,051
AIRPLANE PASSENGER SEAT
William L. Rausch, Oakland, Calif.
(190 E. Stuart, Fresno, Calif.)
Filed Dec. 19, 1961, Ser. No. 160,482
2 Claims. (Cl. 297—216)

This invention relates generally to seats for accommodating passengers in an airplane, and more particularly is directed towards a seat of the character described having safety provisions to protect passengers from injury in the event of a crash or other mishap.

As is well appreciated, airplane accidents cause extreme and often fatal injuries to the plane's passengers. One main cause of injury is the impact of the crash itself. Although the passenger may be strapped in by a seat belt, his body must nevertheless undergo the force of the crash impact. Another problem arises because of a compromise made in favor of the passenger's comfort and convenience, this being that seat belts generally are secured only about the person's waist. As a result, the passenger's head may jolt forward to strike the seat in front of him, or his body may otherwise become exposed to loose objects strewn about during a crash.

The instant airplane seat is adapted to cushion the passenger's body from receiving the full impact of a crash. Moreover, the instant seat in case of a crash places the passenger in a position in which he is unlikely to incur harm from being thrown about or being struck by loose objects. It is to be understood, of course, that this invention is capable of reducing injuries only in those situations where protection of the passenger is reasonably possible. Thus, although the instant seat would be of little utility in the case of a mid-air collision, it is contemplated that harm can be prevented, for example, when a plane crashes after having barely left the ground on takeoff.

Accordingly, it is a primary object of the present invention to provide a novel and improved airplane passenger seat.

Another object of the invention is to provide an airplane seat of the character described that, when the plane crashes, collapses in a manner adapted to prevent injury to the passenger.

A further object of the invention is to provide a seat of the character described which absorbs part of the crash impact that normally is transmitted to a passenger's body.

Still another object of the invention is to provide an airplane seat that places the passenger in a doubled-over position when the plane crashes to prevent a person's head from moving forward to strike the back of the seat in front of him.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention, as set forth in the claims.

FIGURE 1 is a partial top view of three adjoining airplane seats embodying the features of the invention;

FIGURE 2 is a front elevation view of the seats illustrated in FIGURE 1;

FIGURE 3 is cross-sectional view taken through plane 3—3, as shown in FIGURE 2;

FIGURE 4 is a cross-sectional view taken through plane 4—4 of FIGURE 3;

FIGURE 5 is a view taken through plane 5—5 of FIGURE 3;

FIGURE 6 is a view taken through plane 6—6 of FIGURE 3; and

FIGURE 7 is a cross-sectional view of the energy obsorbing piston apparatus that controls the collapsibility of the instant seat.

Referring now to the drawings, the instant airplane seat is seen to include a base frame 11 having at least one front leg 12 and at least one rear leg 13. In broad terms, a seat 14 is mounted on the base frame 11, the seat having a bottom portion 16 and a back portion 17. Although three adjoining seats 14 are shown in FIGURES 1 and 2, the description hereinafter refers in general only to one of these seats.

As is best noted in FIGURE 1, the bottom seat portion 16 is preferably of tubular construction and may be provided with a plurality of spring mounted straps 18 as is conventional in seat construction. The upholstering of the seats 14 is not shown in any of the drawings. The back portion 17 of the seat is best noted in FIGURE 2 and is also seen to be of tubular construction, preferably with a cross bar 19 as is shown.

Looking generally now to the base frame 11, there is shown a base member 21 which is seen to be substantially horizontally disposed and of tubular construction. The legs 12 and 13 are pivotally mounted between the floor and the base member 21 so as to allow the base member 21 to swing from an upward position to a position adjacent the floor. To maintain the member 21 in a normally upright and rigid position, a brace member 22 is provided, this being best noted in FIGURE 3. The brace 22 includes a piston slidable in a cylinder, as is described more fully hereinafter with reference to FIGURE 7. Sufficient impact from a crash causes the brace member to axially retract, whereby the base frame 11 collapses with the base member 21 and seat 14 pivoting forwardly to a downward position adjacent the floor. The cylinder and piston are adapted to control the downward movement of the seat so as to cushion the crash impact to the seated passenger.

With some detail now as regards the base frame 11, there is shown an elongated mounting rail 23, which is adapted for securance to a floor surface and is provided with longitudinally spaced ridges 24 thereon. The rail 23 is spaced from the floor by spacing members 26, and a front leg clamp 27 and rear leg clamp 28 are secured to the rail as seen in FIGURE 3. In FIGURE 6 the leg clamp 27 is seen to comprise a first C-shaped member 29 which is piovtally connected to a second C-shaped member 31, with each of the members 29 and 31 being clamped around the rail 23. Connecting means such as a tie-pin 32 or the like are used to restrain pivotal movement between the two C-shaped members once they are secured to the rail 23, thus maintaining the clamp 27 in place. Note further that each leg clamp is disposed between two of the ridges 24 which serve to prevent longitudinal movement of the clamps along the rail 23.

The legs 12 and 13 are then mounted on the leg clamps, with each leg being pivotable in a plane substantially perpendicular to the floor and parallel to the rail 23. The pivot connections 33 are seen to provide this pivotable leg movement. To complete the base frame structure, the base member 21 is pivotally mounted adjacent the upper ends of the legs 12 and 13 and is thus moveable therewith. More specifically, clamps 34 connect the legs to the base member, and pivot connections 36 provide for pivotable movement between the member 21 and the legs.

In absence of the brace member 22, the base member 21 and the seat mounted thereon are seen to be moveable to swing forwardly. By providing at least one brace 22, connected between the rear portion of the base member 21 and one of the front leg clamps 27, structural rigidity is imparted to the base frame 11. When the brace 22 axially retracts in accordance with its piston and cylinder arrangement, the frame 11 is adapted to collapse and pivot forwardly in the above described manner.

Looking now to FIGURE 7, the brace 22 is described in greater detail. More particularly, the brace is seen to include a closed cylinder 37 having a piston 38 slidable thereon and a piston rod 39 connected to the piston 38. A disc 41 is secured within the cylinder 37 and divides the interior into two chambers 42 and 43, the piston 38 being moveable only within chamber 42. The chamber 42 is then filled with fluid, and a tapered plug 44 is inserted into a correspondingly tapered orifice 46 in the disc 41. When the axial force on the brace 22 is sufficiently large, as for example from the crash of an airplane, the pressure in the fluid becomes great enough to push the plug 44 out of the orifice 46, thus allowing the fluid to flow into the chamber 43 which previously contained only air. The size of the orifice 46 will of course control the rate of fluid flow therethrough, and accordingly the speed of the piston movement through the cylinder. Thus it is seen that upon impact from a crash, the brace 22 acts to cushion the blow received by the passenger, while allowing the seat to pivot forwardly to a position adjacent the floor.

With respect now to the details of the seat 14, the bottom portion 16 thereof is secured adjacent the front of the base member 21 by a pivotable link 47, this being best observed in FIGURE 3. A bracket 48 is secured to the rear of the base member 21 and extends upwardly to have the back seat portion 17 pivotally mounted thereon. More specifically, a plate 49 depends from the back portion 17 and is connected to the bracket 48 by a pivot pin 51, as is seen in FIGURES 3 and 5. Similar hinging apparatus is disposed on each side of the seats 14 as noted in FIGURE 2. To complete the mounting of the bottom portion 16, there is provided a depending bracket 52 from the bottom of the back portion 17, this also being noted in FIGURE 5. The rear of bottom portion 16 is then connected to the bracket 52 by means of a pivot pin 53. It may also be noted at this point that a hole 54 is provided in the bracket 48 as a means for securing seat belts to the seat 14.

Thus, so far as description of the seat has progressed, the back portion 17 is free to pivot about the pin 51, and the bottom portion 16 will move slightly forward and back on its mountings at 53 and 47. Means will next be described for controlling the pivotal movement of the back 17.

The plate 49 is provided with a plurality of notches 56, these preferably being located along the bottom thereof. A bell crank 57 is pivoted at 58 on the bracket 48 and is provided with an end 59 adapted to engage the notches 56. Another bell crank 61 is pivotally mounted on the forward portion of the base member 21, and is coupled to the bell crank 57 by means of a link 62, the bell crank 61 thus serving as a means for releasing the end 59 from engagement with the notches 56. Resilient spring means 63 are provided to keep the bell crank 57 normally urged into engagement with the notches 56.

It is of particular importance to note the bell crank 57 is adapted to engage the notches 56 so as to restrict rearward pivoting of the back 17. On the other hand, the notches are so shaped as to allow the seat back to swing forwardly without release of the bell crank 57, there being needed only a force sufficient to pivot the bell crank 57 out of the way. It is additionally preferable that spring means or the like be used to normally urge the back 17 rearwardly in a reclining position. To this end a spring loaded dash pot 60 is mounted on the forward portion of the base member 21 and a cable 70 extends from the dash pot to the back portion 17 so that upon release of the bell crank 57 from a notch 56 the back portion will be urged rearwardly. Thus, to operate the seat, the bell crank 61 is actuated to allow a person to move back to a reclining position. To return the seat forwardly, the crank 61 is again actuated to release the notches 56. When, however, the plane undergoes the impact of a crash, sufficient force is created to overcome the bell crank 57 without use of the crank 61, and thus the seat back 17 will pivot forwardly under its own momentum to fold over on top of the passenger, thus placing him in a protective doubled-over position. This effect serves two purposes. First, the passenger is disposed in a crouched position which lessens the chance of his being harmed by loose objects or by being himself thrown around. Second, since each seat pivots forwardly, a person being thrown forward by the impact of the crash will not strike the back of the seat in front of him, thus avoiding injury to his head or neck. Instead, the seat in front of each passenger will have pivoted forwardly in accord with the above description to move out of the way of the passenger behind it.

As an additional feature of the instant airplane seat, there is provided a collapsible armrest 65. In general, this armrest may be collapsed to a position below the level of the seat bottom portion 16, thus affording an unrestricted space between adjoining seats. Should the passenger desire, the armrest can be raised to an elevated position in which it can serve its intended purpose. As regards the details of the armrest, there is shown a support arm 64 coupled to the rear of the base member 21 by means of a pair of pivoted links 66 and 67. Another pair of pivoted links 68 and 69 couple the support arm 64 to the front of the base member 21. As means for securing the armrest in its retracted position, a stop member 71 is provided on the support arm 64 intermediate its ends. A hook 72 is then pivotably secured to the base member 21 and is adapted to engage the stop member 71. To release the hook 72 from the stop 71, a bell crank 73 is pivotally mounted on the base member 21 and coupled to the hook 72 by means of a link 74. A resilient spring 76 is employed to normally urge the hook 72 into engagement with the stop member 71.

Thus it is seen that the instant invention provides a new and improved airplane seat capable of safeguarding the passenger in case of a crash. In summary, it is noted that upon crash impact the base frame 11 collapses to cushion the passenger, while simultaneously the seat back 17 pivots forward to double over the passenger, thus placing him in a protected crouched position.

What is claimed is:

1. An airplane passenger seat comprising at least one front leg adapted for securance to a floor surface and adapted for pivotal movement in a plane substantially perpendicular to said surface, at least one rear leg spaced from said front leg in a direction parallel to said plane and adapted for pivotal movement in a plane substantially parallel to that of said front leg movement, a rigid seat base pivotally mounted on the upper ends of said legs for movement therewith, an elongated brace member connected between the rear portion of said base and the floor surface adjacent said front leg, said brace member including a tubular cylinder having a piston slidable therein and adapted to allow pivotal movement of said legs in one direction when said piston moves in said cylinder, a fluid contained in said cylinder for normally restricting movement of said piston thus maintaining said brace member and legs in a rigid position, means for releasing said fluid restriction to allow movement of said piston when sufficient pressure is created in said fluid, a seat bottom mounted on said base, a seat back pivotally secured to the rear of said base and extending upwardly therefrom, a notched plate secured to said seat back, and a bell crank pivotally mounted on said base and having one end thereof adapted to bear against said notched plate to restrict rearward pivotal movement of said seat back, said bell crank adapted to engage said notched plate so as to allow forward pivotal movement of said seat back in said direction of said legs upon sufficient force being applied thereto.

2. An airplane passenger seat comprising two front legs each adapted for securance to a floor surface and each adapted for pivotal movement in a plane substantially perpendicular to said surface, two rear legs each adapted for securance to a floor surface and for pivotal movement in a plane substantially parallel to that of said front leg movement, a rigid seat base pivotally mounted on the upper ends of said legs for movement therewith, a tubular cylinder pivotally secured adjacent one end thereof to the rear portion of said base and extending towards the floor adjacent said front legs, a piston slidably disposed within said cylinder, a piston rod connected between said piston and one of said front clamps, a wall partitioning the interior of said cylinder into two chambers one of which houses said piston, a fluid contained in said one chamber for normally preventing movement of said piston therein, said wall having an orifice therethrough, a releasable plug disposed in said orifice and adapted to be removed therefrom when sufficient pressure is created in said fluid whereby said piston is movable to allow forward pivotal movement of said legs and said seat base therewith, a seat bottom mounted on said base, a seat back pivotally secured adjacent its bottom to the rear portion of said base and extending upwardly therefrom, a notched plate secured to said seat back adjacent the bottom thereof and disposed substantially parallel to the plane of pivotal movement thereof, a bell crank pivotally mounted on said frame and having one end thereof adapted to bear against said notch plate to restrict rearward pivotal movement of said seat back, said bell crank adapted to engage said notch plate so as to allow forward pivotal movement of said seat back upon sufficient force being applied thereto, resilient means urging said bell crank into engagement with said notch plate, means for overcoming said resilient means to release said bell crank from said notch plate, and second resilient means normally urging said seat back pivotally forward, said seat back being forwardly pivotable to a collapsed position upon sufficient force to disengage said bell crank from said plate.

References Cited in the file of this patent
UNITED STATES PATENTS

| | | |
|---|---|---|
| 2,336,013 | Hamilton | Dec. 7, 1943 |
| 2,506,156 | Long | May 2, 1950 |
| 2,682,931 | Young | July 6, 1954 |
| 2,700,412 | Evans et al. | Jan. 25, 1955 |
| 2,726,060 | Elsner | Dec. 6, 1955 |
| 2,833,379 | Matthews et al. | May 6, 1958 |
| 2,893,473 | Pitts et al. | July 7, 1959 |
| 2,899,167 | Elsner | Aug. 11, 1959 |
| 2,933,127 | Brewster | Apr. 19, 1960 |
| 2,955,648 | Krajewski | Oct. 11, 1960 |
| 2,959,207 | Brewster | Nov. 8, 1960 |
| 2,997,325 | Peterson | Aug. 22, 1961 |
| 3,001,821 | Marechal | Sept. 26, 1961 |
| 3,022,976 | Zia | Feb. 27, 1962 |
| 3,037,812 | Monroe | June 5, 1962 |
| 3,059,966 | Spielman | Oct. 23, 1962 |

FOREIGN PATENTS

| | | |
|---|---|---|
| 1,095,113 | France | May 27, 1955 |